United States Patent
Mari Curbelo et al.

(10) Patent No.: US 9,235,227 B2
(45) Date of Patent: Jan. 12, 2016

(54) APPARATUS AND METHOD FOR MITIGATING PERTURBATIONS IN A POWER CONVERTER

(71) Applicant: General Electric Company, Schenectady, NY (US)

(72) Inventors: Alvaro Jorge Mari Curbelo, Bayern (DE); Ajith Kuttannair Kumar, Erie, PA (US); Henry Todd Young, Erie, PA (US); Jason Daniel Kuttenkuler, Erie, PA (US); Sebastian Pedro Rosado, Munich (DE)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 13/737,428

(22) Filed: Jan. 9, 2013

(65) Prior Publication Data

US 2014/0191745 A1     Jul. 10, 2014

(51) Int. Cl.
*H02M 3/156* (2006.01)
*G05F 3/08* (2006.01)
*H02M 3/158* (2006.01)
*H02M 1/12* (2006.01)
*H02M 1/42* (2007.01)
*H02M 1/14* (2006.01)
*H02M 3/157* (2006.01)

(52) U.S. Cl.
CPC ............... *G05F 3/08* (2013.01); *H02M 3/158* (2013.01); *H02M 1/12* (2013.01); *H02M 1/14* (2013.01); *H02M 1/42* (2013.01); *H02M 3/157* (2013.01); *H02M 3/1588* (2013.01); *H02M 2001/123* (2013.01)

(58) Field of Classification Search
CPC .... H02M 1/14; H02M 1/42; H02M 2001/123; H02M 3/156; H02M 3/1584
USPC .......... 323/225, 232, 233, 271, 272, 282–290
See application file for complete search history.

(56) References Cited

U.S. PATENT DOCUMENTS

| | | | |
|---|---|---|---|
| 4,713,742 A | 12/1987 | Parsley | |
| 5,227,962 A * | 7/1993 | Marsh | 363/39 |
| 5,932,995 A | 8/1999 | Wagoner | |
| 6,373,732 B1 * | 4/2002 | Patel et al. | 363/72 |
| 2008/0197823 A1 * | 8/2008 | Crowther et al. | 323/271 |
| 2008/0204098 A1 * | 8/2008 | Qahouq et al. | 327/175 |
| 2008/0291705 A1 * | 11/2008 | Alacoque | 363/39 |
| 2013/0329471 A1 * | 12/2013 | Escobar et al. | 363/40 |

\* cited by examiner

*Primary Examiner* — Jessica Han
(74) *Attorney, Agent, or Firm* — GE Global Patent Operation; John A. Kramer

(57) ABSTRACT

A power converter includes a plurality of switches that interconnect first and second input terminals of the power converter with first and second output terminals of the power converter. The switches are switched to convert power from the input terminals to the output terminals. During the switching, voltage spikes are mitigated by a first RLC branch connected from the first input terminal to the first output terminal and by a second RLC branch connected from the second input terminal to the second output terminal.

20 Claims, 8 Drawing Sheets

APPARATUS AND METHOD FOR MITIGATING PERTURBATIONS IN A POWER CONVERTER

BACKGROUND

1. Technical Field

Embodiments of the invention relate generally to power converters. Other embodiments relate to non-isolated full bridge power converters.

2. Discussion of Art

Power supplies are electronic/electrical circuits that supply electric power to one or more electric loads. The term "power supply" is most commonly applied to collections or an assembly of electrical devices that convert one form of electrical energy to another, which are commonly referred to as "power converters." Many power supplies include two or more power converters connected together. Typically, power converters are "switching" power converters, in which multiple solid state devices are used to intermittently interrupt an input current so as to effectuate conversion of the input current to an output current having different amplitude, voltage, and/or frequency. For example, a "DC power converter" produces output power at a substantially constant output voltage and/or current.

Conventional power converters, generally, are groupings of plural solid state switches that are connected to output terminals from a first DC input terminal or from a second DC input terminal. Paired DC terminals typically are known jointly as a "DC link," while the term "DC link voltage" often is used to refer to an electrical potential difference across this DC link. Thus, a conventional DC-DC power converter is connected between an input (primary) DC link and an output (secondary) DC link.

Power converters can be "isolated" or "non-isolated." In an isolated power converter, a transformer electromagnetically couples a primary circuit of the power converter to a secondary circuit of the power converter. In other words, there is no direct electrical connection between the primary DC link and the secondary DC link. By contrast, a non-isolated power converter electrically connects the primary DC link with the secondary DC link.

Power converters can be "half bridge" or "full bridge." A half bridge power converter switches current in only one direction to a load, that is, polarity is maintained across the primary and secondary links. In contrast, a full bridge power converter can switch current in either direction to the load, fully commuting the current so that polarity can be inverted from the primary link to the secondary link.

The instant invention relates principally to non-isolated full bridge power converters. One example of a non-isolated full bridge power converter is a "dual buck" power converter.

In a typical buck power converter, a first switch, a first inductor, and a first diode form a three-way node between the first DC input terminal, a first output terminal, and the second DC input terminal. In operation, the first switch is intermittently cycled, and the first inductor smoothes resultant voltage surges to produce an averaged high voltage at the first output terminal that is less than the voltage at the first DC input terminal. In a "dual buck" power converter, a second switch, a second inductor, and a second diode form a second three-way node between the second DC input terminal, a second output terminal, and the first DC input terminal. The second switch also is intermittently cycled, in some embodiments synchronously, with the first switch, to produce an averaged low voltage at the second output terminal. The first switch, first inductor, and first diode may be referred to as a first "leg" of the converter that connects the first and second input terminals with the first output terminal; while the second switch, second inductor, and second diode form a second leg of the converter that connects the first and second input terminals with the second output terminal.

The symmetry of the dual buck power converter makes it attractive for operating in DC systems isolated from ground, because in an ideal operation the first and second branches are under the same V and I stresses. However, the circuit has an undesirable behavior under common mode perturbations. Those perturbations can be originated, for example, by jitter (asynchronicity or time difference) in the switching of active power semiconductors (exemplary solid state switches). The effect of jitter in the dual buck topology is to create large spikes in the output terminal voltages with respect to ground at the input and output DC connections. Such spikes stress the electrical insulation of the circuit components and can severely affect the converter lifetime.

In view of the above, it is desirable to provide a dual buck converter topology in which common mode perturbations are mitigated.

BRIEF DESCRIPTION

In embodiments, a power converter apparatus (e.g., a non-isolated full bridge power converter apparatus) connects first and second input terminals with first and second output terminals. The power converter comprises first and second converter legs connecting the input terminals to the output terminals. (For example, in operation of the power converter apparatus, the converter legs are controllably switched to convert power between the input terminals and output terminals.) The power converter apparatus further includes a first RLC branch connected from the first input terminal to the first output terminal, and a second RLC branch connected from the second input terminal to the second output terminal. The first and second RLC branches are configured to mitigate voltage spikes during commutation of the input and output terminals.

In other embodiments, a power converter apparatus (e.g., a non-isolated full bridge power converter apparatus) connects first and second input terminals with first and second output terminals. The power converter apparatus comprises a plurality of converter legs connecting the input terminals to the output terminals. (For example, in operation of the power converter apparatus, the converter legs are controllably switched to convert power between the input terminals and output terminals.) The power converter apparatus further includes a first RLC branch connected from the first input terminal to the first output terminal, a second RLC branch connected from the second input terminal to the second output terminal, a third RLC branch connected from the first input terminal to the second output terminal, and a fourth RLC branch connected from the second input terminal to the first output terminal. The RLC branches are configured to mitigate voltage spikes during commutation of the input and output terminals.

In aspects of the invention, voltage spikes are mitigated in a power converter (e.g., in a non-isolated full bridge power converter) by connecting two or more RLC branches between input terminals and output terminals of the power converter. Respective resistive, inductive, and capacitive components of the RLC branches are selected to produce natural periods that are longer than a duration of a switching transient of the power converter (e.g., at least ten times longer, such as at least ten times longer than a jitter value between legs of the power converter). For example, the switching transient may be an expected switching transient (that is, an estimated value based on testing and/or circuit characteristics), with the resistive, inductive, and capacitive components being selected to account for the expected switching transient.

In another embodiment, a method of controlling a power converter comprises controlling, with a control module, switching of a plurality of converter legs that interconnect first and second input terminals of the power converter with first and second output terminals of the power converter, to convert power from the input terminals to the output terminals. The method further comprises mitigating voltage spikes during the switching with a first RLC branch connected from the first input terminal to the first output terminal and a second RLC branch connected from the second input terminal to the second output terminal. For example, the RLC branches may have respective values of resistance, inductance, and capacitance such that respective natural periods of the RLC branches are longer than a duration of a switching transient associated with the converter legs (e.g., at least ten times longer, such as at least ten times longer than a jitter of the converter legs).

DRAWINGS

The present invention will be better understood from reading the following description of non-limiting embodiments, with reference to the attached drawings, wherein below:

DETAILED DESCRIPTION

Figure 1:
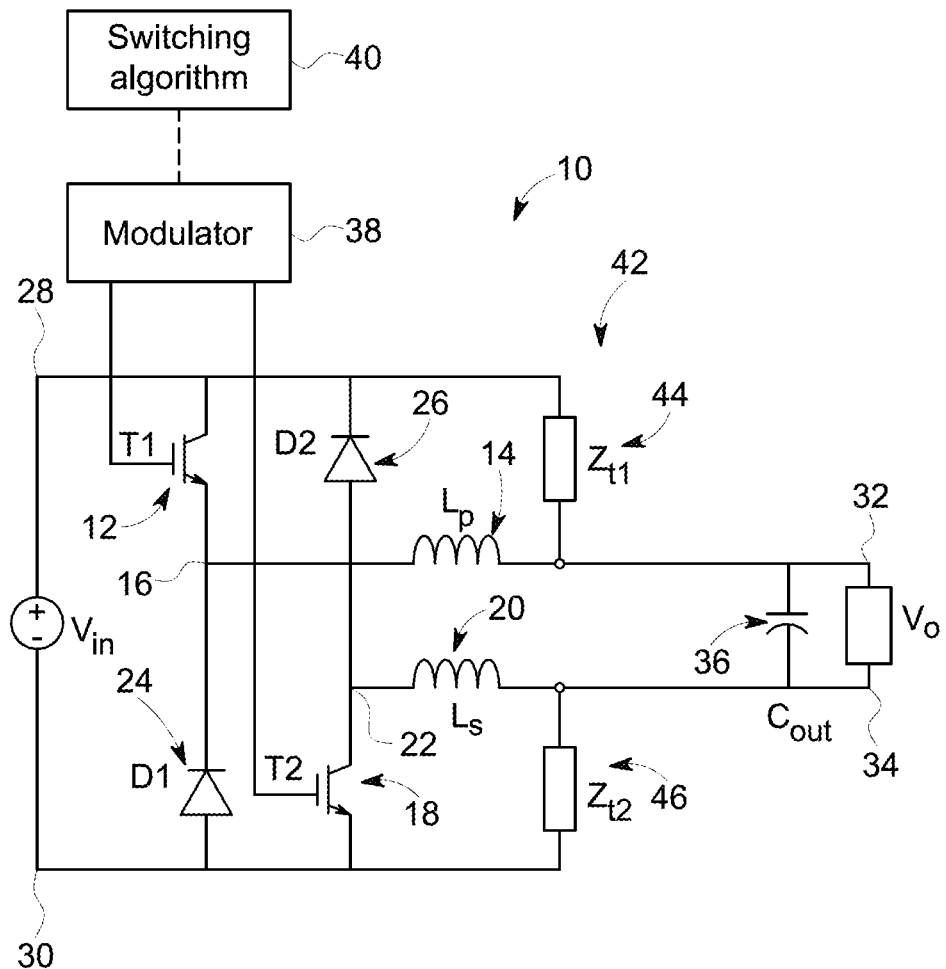
FIG. 1 shows a dual buck power converter having an auxiliary network of two RLC branches, according to a first embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

Aspects of the invention relate to power converters including auxiliary networks of resistive, capacitive, and inductive components (referred to as RLC branches) that are electrically connected across the main switching components so as to mitigate switching transients. In this context, unless otherwise specified, "electrically connected" or simply "connected" mean physically connected so as to conduct current between two points, substantially without intervening impedances. "Substantially," "about," and "generally" all are relative terms indicating as close to the desired value as can reasonably be achieved within conventional manufacturing tolerances.

In certain aspects, fast transient common mode disturbances are mitigated in the primary or secondary circuits of symmetrical buck power converters. A common cause of such type of disturbances is "jitter" (asynchronicity, or time displacement) in the gating signals of the active devices within the power converters, as further discussed below. Nevertheless, the operating principles of the present invention make it suitable for mitigating other possible type of common mode disturbances. Advantages of the proposed invention include both simplicity and relatively low magnitudes of the circuit elements, which result in low cost of the components and implementation.

In certain aspects, the invention does not require changes in the operation of a converter, and indeed permits switching within wider time windows or with enhanced tolerance for switching delays (jitter) between converter legs of the dual buck converter. In selected aspects, the present invention enables use of dual buck converters with center connection to ground (ground symmetric buck converters).

In an exemplary embodiment, as shown in FIG. 1, a dual buck power converter 10 connects first and second input terminals (primary DC link) 28, 30 with first and second output terminals 32, 34 (secondary DC link). The dual buck power converter 10 includes a first switch 12 (T1), a first inductor 14 (Lp), and a first freewheel diode 24 (D1), which respectively connect a first node 16 with the first input terminal 28, the first output terminal 32, and the second input terminal 30. The first switch 12, the first inductor 14, and the first freewheel diode 24 together form a first leg of the power converter 10. The dual buck power converter 10 also includes a second switch 18 (T2), a second inductor 20 (Ls), and a second freewheel diode 26 (D2), which respectively connect a second node 22 with the second input terminal 30, the second output terminal 34, and the first input terminal 28. The second switch 18, the second inductor 20, and the second freewheel diode 26 together form a second leg of the power converter 10. (Although schematics for bipolar transistors are shown, the first and second switches 12, 18 may be any appropriate switching device, such as insulated gate bipolar transistors (IGBT or IEGT), power MOSFETs, integrated gate commutated thyristors (IGCT), gate turn-off thyristors (GTO), or others providing similar functionality.) The first and second freewheel diodes 24, 26 are provided for conducting current through the first and second inductors 14, 20 while the first and second switches 12, 18 are switched off. An output buffer capacitor 36 is connected across the output terminals 32, 34, for smoothing voltage fluctuations during commutation of the load.

The first and second switches 12, 18 are connected to be switched by a control module, which includes electronic components or other hardware for applying control voltages to selectively/controllably switch the switches. The control module may additionally include one or more sets of instructions or other software, stored on a tangible non-transitory medium and accessible/readable by the hardware, according to which the hardware operates to switch the switches. In an embodiment, the control module comprises a modulator 38 and a step down switching algorithm 40 (embodied in the one or more sets of instructions or other software). The modulator 38 is configured to operate according to the step down switching algorithm 40 for selecting switching intervals of the first and second switches 12, 18. The switching algorithm 40 includes instructions for selecting switching intervals to produce a desired output voltage across terminals 32, 34, based on the primary DC link voltage (input voltage) across terminals 28, 30. The switching algorithm 40 is considered a step down algorithm in case the desired output voltage is less than a voltage across the input terminals 28, 30. Use of a step down switching algorithm makes the power converter 10 a "buck" converter. While in embodiments the algorithm may be an implementation in software running on a processor (e.g., RISC) part of the control module, the switching interval instructions equally may be implemented in fixed circuitry (e.g., ASIC) or in reprogrammable circuitry (e.g., FPGA) that is part of the control module.

Figure 7:
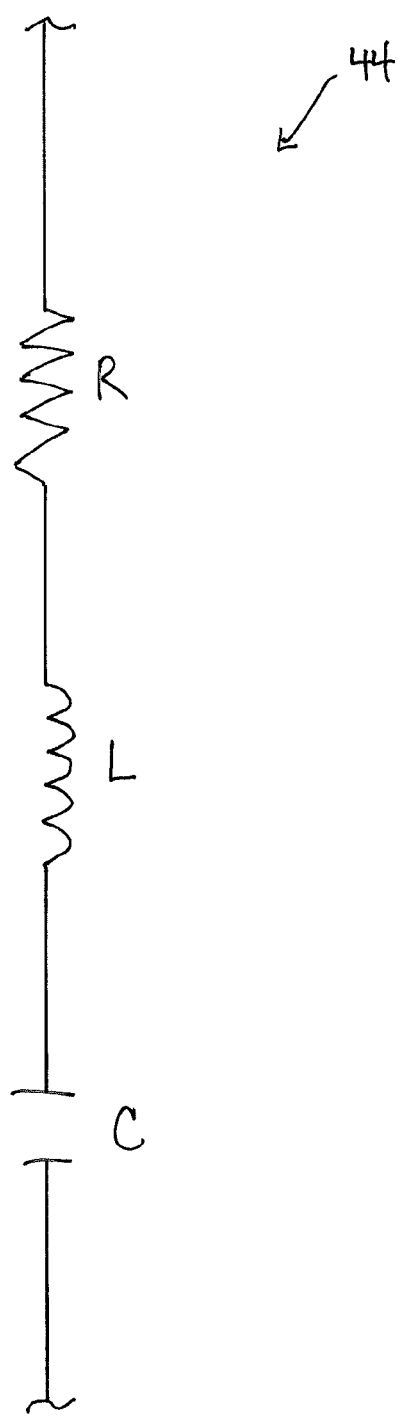
FIG. 7 shows a detail view of the RLC branches of the dual buck power converter of FIG. 1, according to embodiments of the invention.

Additionally, the power converter 10 includes auxiliary network circuitry 42 for mitigating switching transients. The auxiliary network circuitry includes a first RLC branch 44 (Zt1) that is connected across a first branch of the power converter (that is, connected between the first input 28 and the first output 32), as well as a second RLC branch 46 (Zt2) that is connected across a second branch of the power converter (that is, connected between the second input 30 and the second output 34). Each RLC branch 44,46 includes a series connection of respective capacitive (C), resistive (R), and inductive (L) elements, which are collectively represented as an impedance Z. A detail view of an exemplary RLC branch 44 is illustrated in FIG. 7. Each RLC branch described herein may be similarly configured and includes a resistive element (R), an inductive element (L) and a capacitive element (C). Each first or second RLC branch 44,46 is connected across the respective first or second input and output terminals of the power converter 10.

Figure 2:
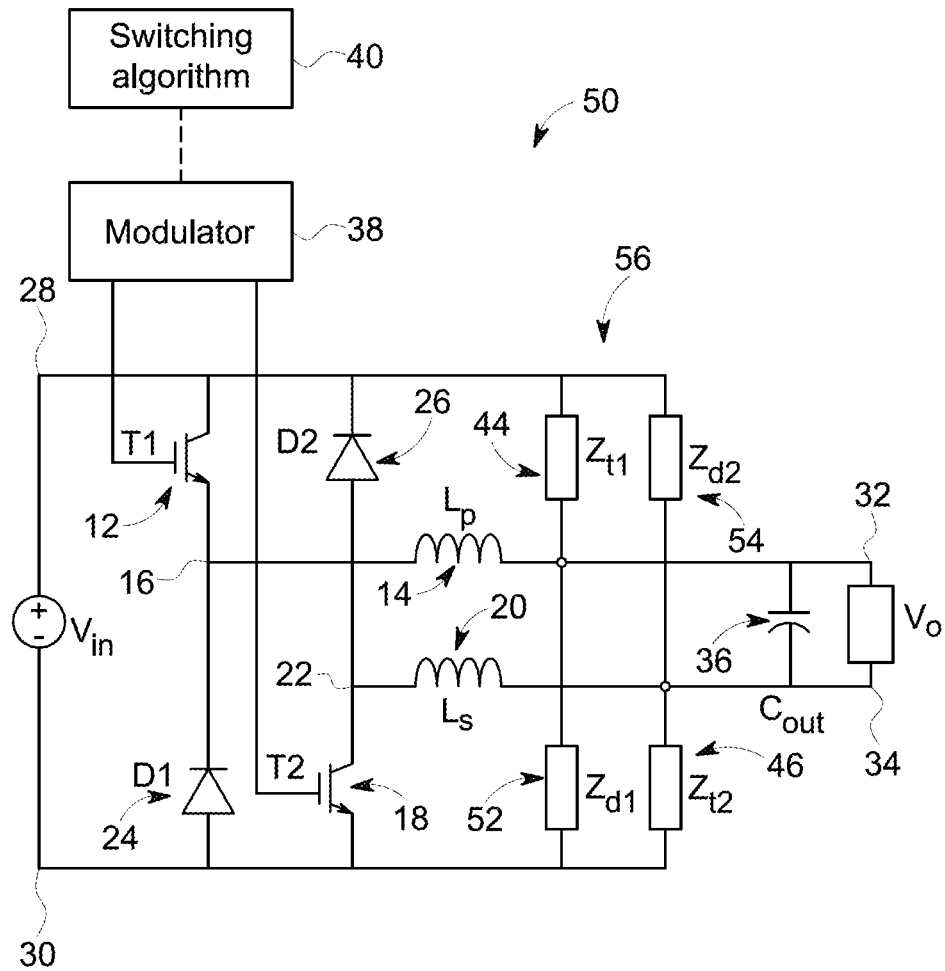
FIG. 2 shows a dual buck power converter having an auxiliary network of four RLC branches, according to a second embodiment of the invention.

In another embodiment, as shown in FIG. 2, a power converter 50 (buck power converter) has third and fourth RLC branches 52 (Zd1), 54 (Zd2) within its auxiliary network circuitry 56. The third RLC branch 52 is connected across the second output and the first input (e.g., across the first freewheel diode 24 and the first inductor 14), while the fourth RLC branch 54 is connected across first input and the second output (e.g., across the second freewheel diode 26 and the second inductor 20). Thus, these additional auxiliary network branches 52, 54 cross-connect the first and second input and output terminals.

Inductive elements of the auxiliary network RLC branches 44, 46, 52, 54 are kept small relative to the main inductances 14, 20. For example, in embodiments, the RLC branch inductances each are specified to be less than about 0.1% of the main inductances. Thus, connecting cable inductances can be used in each of the RLC branches 44, 46, 52, 54 without requiring additional inductive coil components. The capacitive, resistive, and inductive elements of the RLC branches are configured as low pass filters to mitigate voltage spikes that occur when the converter legs 16, 22 are switched to commutate the input terminals. Aspects to consider in regards to the configuration of the capacitive, resistive, and inductive filter components include a target for low energy dissipation at the filter components (relatively low resistance); a need for adequate voltage filtering with small current circulation through the filter branch (relatively high capacitance); a natural period (1/natural frequency) of the RLC branch being considerably longer (~×10 or more, i.e., at least ten times) than the maximum expected jitter (time difference of switching between the two converter legs), or, more generally, being at least ten times longer than the duration of a design switching transient; and the capacitance value is a compromise between the desired voltage spike limitation and capacitor size. So, the capacitor (capacitive filter component/element) is selected as the minimum that keeps the voltage spike within a desired limit under a design maximum value of jitter.

The final specifications of the filter components are given by the circuit voltage difference between primary and secondary sides. For example, in an exemplary working embodiment of the invention, a symmetric buck converter operates with a four-branched auxiliary network at a rated power of 447.6 kW, switching 1800 V DC input at 600 Hz to produce 750 V DC output. The values of the main (first and second inductors 14, 20) inductances are 1.2 mH, while the output buffer capacitor 36 is rated at 18 mF. The filter components, in each RLC branch of the auxiliary network, are respectively rated at 20 ohm, 1 µH, 5 µF.

Figure 3:
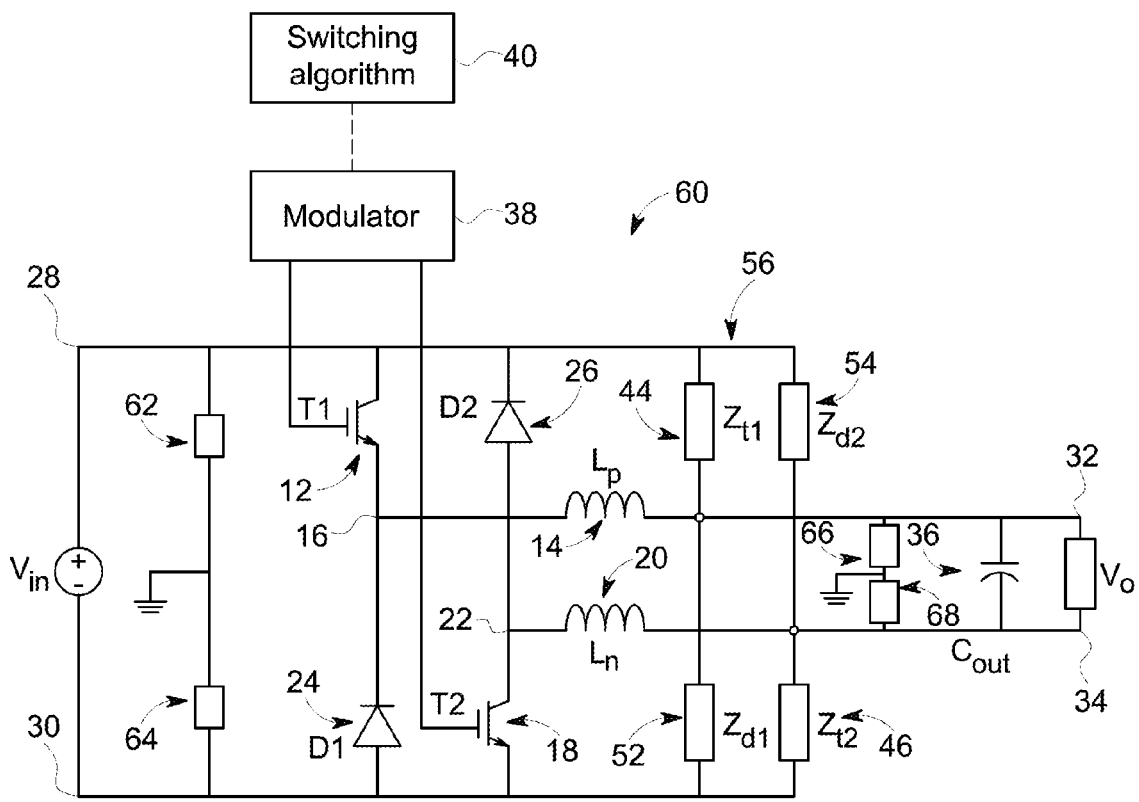
FIG. 3 shows a dual buck power converter according to FIG. 2, with center ground impedance connections, according to a third embodiment of the invention.

In another exemplary embodiment, as shown in FIG. 3, a power converter (e.g., symmetric buck converter) 60 includes center ground impedances 62, 64 at the primary side (i.e., connected from the input terminals 28, 30 to ground reference), while center ground impedances 66, 68 are included at the secondary side (i.e., connected from the output terminals 32, 34 to ground reference). By matching the center ground impedances 62, 64, 66, 68, ground symmetry is provided throughout the power converter 60.

In normal operation of a power converter according to FIG. 2, the first and second switches 12, 18 will be gated simultaneously on and off by the modulator 28, such that the positive and negative terminals 28, 30 in the primary and 32, 34 in the secondary will have symmetric potentials with respect to the center ground reference. Nevertheless, jitter, i.e., loss of simultaneity in the gating of switches 12 and 14, can occur as shown in FIGS. 4A-4B.

Figure 4A:
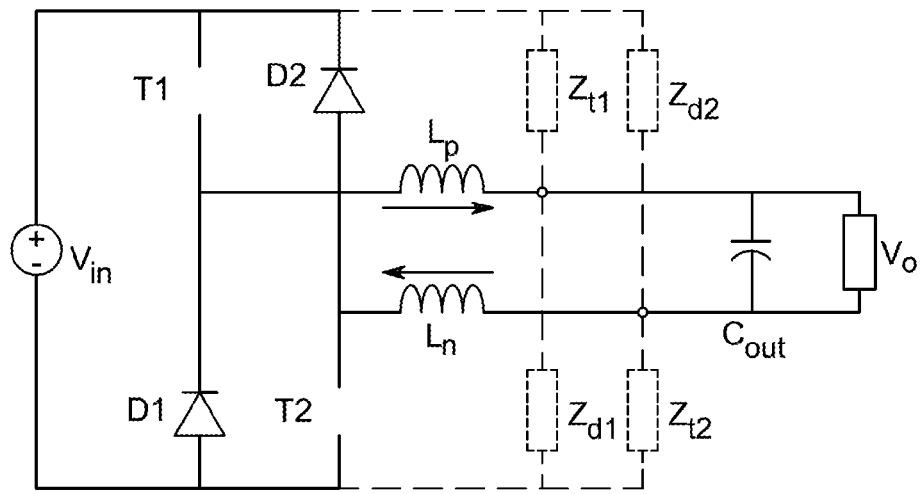
FIGS. 4A and 4B show switching circuit behavior of the dual buck power converter shown in FIG. 2.
Figure 4B:
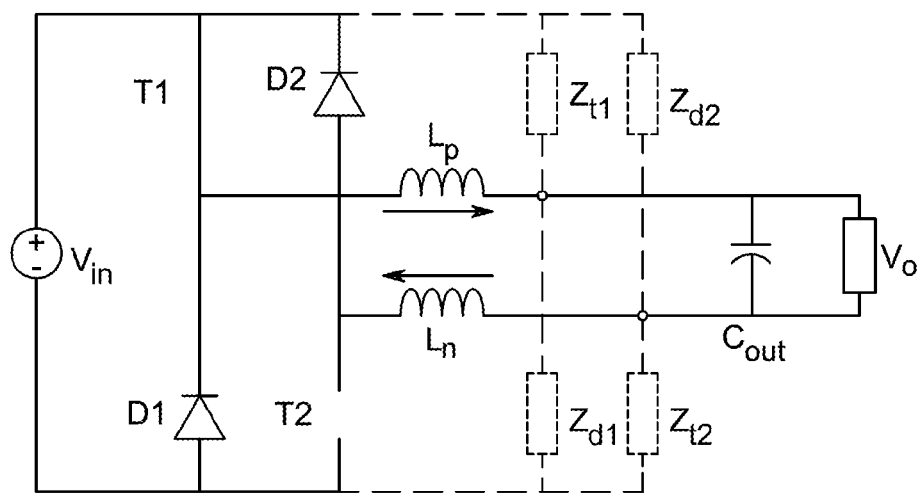

Referring to FIG. 4A, while the two switches (e.g., active semiconductor devices) T1, T2 are off, a load current is conducted from the first and second inductors Lp and Ln through the first and second freewheel diodes D1, D2. In case the first and second switches T1, T2 are turned on simultaneously, then the inductors Lp and Ln symmetrically commutate to the opposite polarities, thereby keeping the voltage in the secondary side balanced with respect to ground. However, in case the first switch is first to be turned on, as shown in FIG. 4B, then suddenly the two primary terminals of both inductances Lp and Ln are connected to the primary positive terminal. This can cause a spike of secondary terminal voltage, which can be mitigated by the auxiliary network RLC branches Zt1, Zt2, Zd1, Zd2 as shown in FIGS. 5A-5B.

Figure 5A:
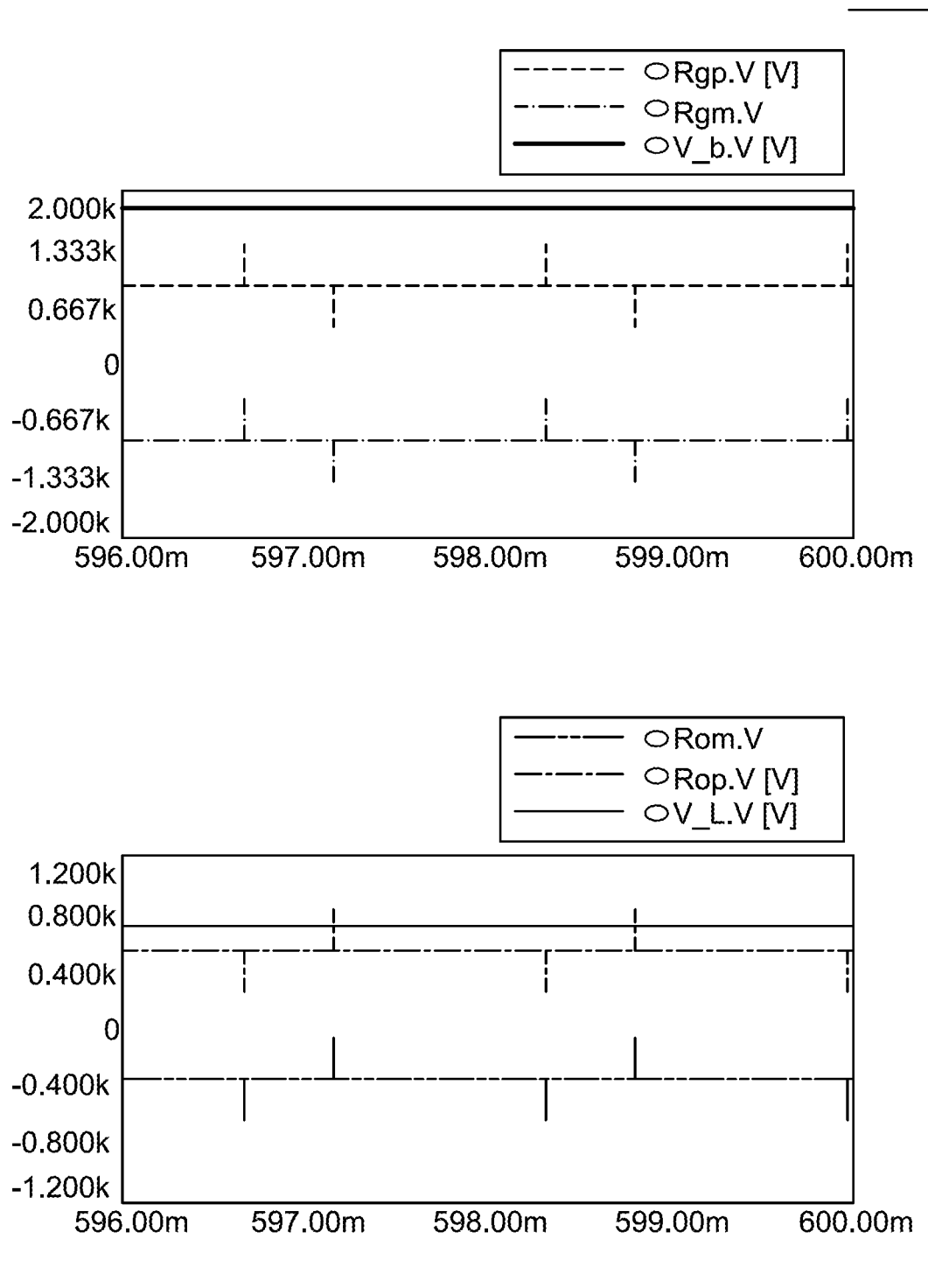
FIGS. 5A and 5B show comparative switching transients for a conventional dual buck power converter, and for a dual buck power converter according to FIG. 2.
Figure 5B:
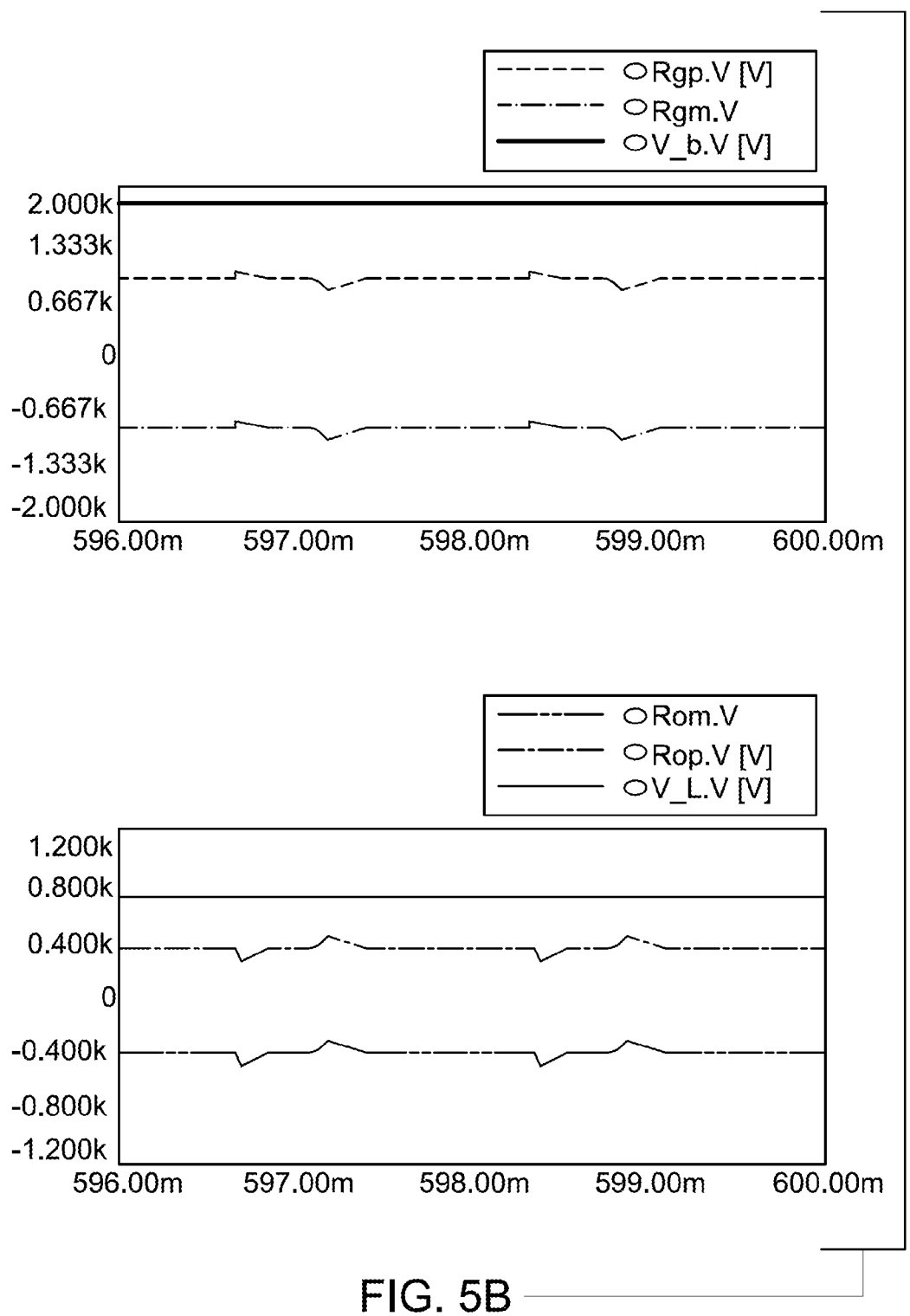

FIGS. 5A and 5B illustrate switching transients with a jitter or duration of 10 µsec between closing the first switch 12 and closing the second switch 18 of FIG. 2. FIG. 5A illustrates the switching transients for a case with no RLC branches, while FIG. 5B illustrates the switching transients for the exemplary embodiment discussed above with reference to FIG. 2. At top in each figure are shown voltages Rgp, Rgm at terminals 28, 30 relative to ground, as well as the primary link voltage V_b. At bottom in each figure are shown voltages Rap, Rom at terminals 32, 34 relative to ground, as well as the secondary link voltage V_L. FIG. 5A illustrates a situation when the first switch 12 is turned on before the second switch 14, and no RLC branches are provided: there are large displacements of the primary and secondary terminal voltages. In particular, voltage at the positive secondary terminal 32 moves significantly at each transient, first towards the voltage at the negative primary terminal 30, then towards the voltage at the positive primary terminal 28. Voltage at the negative secondary terminal 34 moves in tandem with the positive secondary terminal voltage, so that the secondary link voltage V_L remains about constant while shifting with reference to ground.

FIG. 5B shows that, with the four RLC (auxiliary network) branches, there are relatively small displacements of the secondary terminal voltages (no more than about 48 V), so that the effects of switching jitter are mitigated. (By contrast, under similar conditions without the auxiliary network branches, spikes of up to about 450 V are observed.) Thus, it can be seen that the auxiliary network (RLC) branches provide a path that fixes the center reference of the secondary voltage in relation to the primary voltage.

Although jitter surges can be mitigated using only the first and second RLC branches 44, 46, as shown in FIG. 1, in such an embodiment the output buffer capacitor 36 also is used as part of the auxiliary network. In such case the embodiment shown in FIG. 1 requires that the values of the auxiliary RLC branches 44, 46 be sized somewhat larger than might otherwise be needed. It is possible to provide third and fourth RLC branches 52, 54 as well, as shown in FIG. 2, in which case, the output buffer capacitor 36 no longer need be relied upon as part of the auxiliary network.

Although the function of the RLC branches 44, 46, 52, 54 was explained specifically with respect to mitigating voltage spikes due to jitter, they will mitigate any common mode fast changing voltage transient, i.e., voltage displacement with respect to a common reference. The design of the RLC branches and the values of the resistive, inductive, and capacitive components are given by the size of the expected perturbation and the duration of the transient phenomena that requires mitigation.

Figure 6:
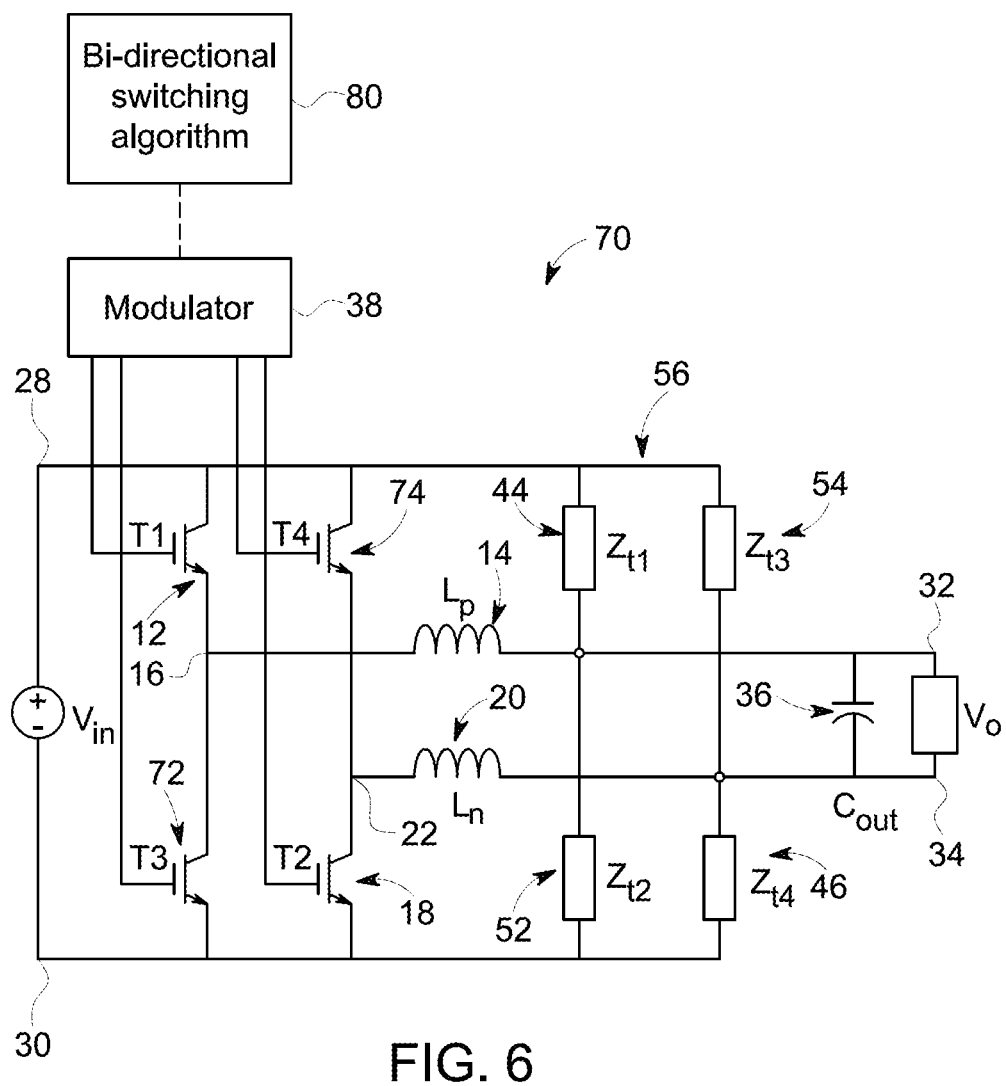
FIG. 6 shows a bidirectional dual buck power converter having an auxiliary network of four RLC branches, according to a fourth embodiment of the invention.

In a fourth embodiment of the invention, as shown in FIG. 6, a power converter (bi-directional buck converter) 70 includes third and fourth switches 72, 74 (T3, T4) that are in effect substituted for the first and second freewheel diodes 16, 18. Thus, the third switch 72 is connected between the first node 16 and the second input terminal 30, while the fourth switch 74 is connected between the second node 22 and the first input terminal 28. The four switches 12, 18, 72, 74 can be switched by the control module, e.g., the modulator 38 operating according to a bi-directional switching algorithm 80, to transfer power in either direction between the DC link terminals 28, 30 and the nominal load terminals 32, 34, with buck or boost capability. In this fourth embodiment, due to the presence of four converter legs, all four RLC branches 44, 46, 52, 54 are provided for mitigating jitter or other switching transients within the bi-directional buck converter 70.

Thus, in embodiments, a power converter apparatus is provided, e.g., a non-isolated full bridge power converter apparatus, that connects first and second input terminals with first and second output terminals. The power converter apparatus includes a first converter leg connecting the first and second input terminals to the first output terminal, and a second converter leg connecting the first and second input terminals to the second output terminal. In certain embodiments, the first converter leg may include a first switch connected from a first input terminal to a first node, a first freewheel diode connected from the first node to a second input terminal, and a first inductor connected from the first node to a first output terminal, while the second converter leg may include a second switch connected from the second input terminal to a second node, a second freewheel diode connected from the second node to the first input terminal, and a second inductor connected from the second node to a second output terminal. Additionally, the power converter apparatus includes a first RLC branch connected from the first input terminal to the first output terminal, and a second RLC branch connected from the second input terminal to the second output terminal. The first and second RLC branches are configured to mitigate voltage spikes during commutation of the first and second switches.

In other embodiments, the first and second RLC branches are configured to mitigate voltage spikes by having respective values of resistance, inductance, and capacitance such that respective natural periods of the RLC branches are longer than a switching transient of the power converter apparatus, e.g., at least ten times a jitter between the first and second converter legs. (For example, an expected jitter between the first and second converter legs may be determined based on circuit parameters/models and/or testing, and the resistance, inductance, and capacitance selected, according to standard RLC filter design techniques, to provide a natural period that is at least ten times the expected jitter.) For example, in some embodiments the first and second inductors are rated at approximately 1.2 mH (i.e., between 0.9 and 1.5 mH) and the output buffer capacitor is rated at approximately 18 mF (i.e., between 15 and 21 mF), while the first and second RLC branches are rated at approximately 20 ohm (18-22 ohm), 2 µH (1.5-2.5 µH), and 10 µF (8-12 µF). Such an embodiment may be connected with approximately 1800 V (1750-1850 V) direct current voltage across the input terminals, and with the first and second converter legs being switched at approximately 600 Hz (550 Hz-650 Hz) to provide approximately 750 V (700-800 V) direct current voltage across the output terminals. Such an embodiment may deliver approximately 450 kW (400-500 kW) power to the output terminals. In other embodiments, the power converter may also include a third RLC branch connected from the first input terminal to the second output terminal, and a fourth RLC branch connected from the second input terminal to the first output terminal. The third and fourth RLC branches also are configured to mitigate voltage spikes during commutation of the first and second switches.

In other embodiments, a power converter apparatus (e.g., non-isolated full bridge power converter apparatus) connects first and second input terminals with first and second output terminals. The power converter apparatus includes a plurality of converter legs connecting the first and second input terminals with the first and second output terminals. In some embodiments, the plurality of converter legs include: a first switch connected from a first input terminal to a first node; a first inductor connected from the first node to a first output terminal; a second switch connected from the first input terminal to a second node; a second inductor connected from the second node to a second output terminal; a third switch connected from the first node to the second input terminal; and a fourth switch connected from the second node to the second input terminal. The power converter also includes: a first RLC branch connected from the first input terminal to the first output terminal; a second RLC branch connected from the second input terminal to the second output terminal; a third RLC branch connected from the first input terminal to the second output terminal; and a fourth RLC branch connected from the second input terminal to the first output terminal. The RLC branches are configured to mitigate voltage spikes during commutation of the first, second, third, and fourth switches.

In certain embodiments, the RLC branches are configured to mitigate voltage spikes by having respective values of resistance, inductance, and capacitance such that respective natural periods of the RLC branches are longer than a switching transient of the power converter apparatus, e.g., at least ten times a jitter between any of the converter leas. For example, the first and second inductors may be rated at approximately 1.2 mH and the output buffer capacitor may be rated at approximately 18 mF, while the first and second RLC branches are rated at approximately 20 ohm, 1 µH, and 5 µF. Such an exemplary embodiment may be connected with approximately 1800 V direct current voltage across the input terminals, and the first and second converter legs may be switched at approximately 600 Hz to provide approximately 750 V direct current voltage across the output terminals. Such an embodiment may deliver approximately 450 kW power to the output terminals. Based on switching control, the power converter may be configured to operate in a first mode of operation wherein power is converted from the inputs to the outputs and in a second mode of operation wherein power is converted from the outputs to the inputs.

In other embodiments, a method is provided, e.g., a method for mitigating voltage spikes in a non-isolated full bridge power converter. The inventive method includes connecting two or more RLC branches between input terminals and output terminals of the power converter, and selecting respective resistive, inductive, and capacitive components of the RLC branches to produce respective natural periods longer than a switching transient of the power converter, e.g., at least ten times an expected jitter between legs of the power converter. For example, inductances of the RLC branches may be selected to match connecting cables of the RLC branches. In certain embodiments, each inductive component is rated at approximately 1 µH, each resistive component is rated at approximately 20 ohm, and each capacitive element is rated at approximately 5 µF. The method may further include connecting approximately 1800 V direct current input to the dual buck converter, and switching the converter legs at approximately 600 Hz to provide approximately 750 V, 450 kW direct current output.

In another embodiment, a method of controlling a power converter comprises controlling, with a control module, switching of a plurality of converter legs that interconnect first and second input terminals of the power converter with first and second output terminals of the power converter, to convert power from the input terminals to the output terminals. The method further comprises mitigating voltage spikes during the switching with a first RLC branch connected from the first input terminal to the first output terminal and with a second RLC branch connected from the second input terminal to the second output terminal. For example, the RLC branches may have respective values of resistance, inductance, and capacitance such that respective natural periods of the RLC branches are longer than a switching transient (e.g., jitter) associated with the converter legs, e.g., at least ten times longer.

Thus, in an embodiment, a method of controlling a power converter comprises controlling, with a control module, switching of a plurality of switches that interconnect first and second input terminals of the power converter with first and second output terminals of the power converter, to convert power from the input terminals to the output terminals. The method further comprises mitigating voltage spikes during the switching with a first RLC branch connected from the first input terminal to the first output terminal and with a second RLC branch connected from the second input terminal to the second output terminal.

In another embodiment of the method, respective natural periods of the first RLC branch and the second RLC branch are longer than (e.g., at least ten times longer than) a duration of a switching transient of the power converter. The natural periods are based on (i.e., are a function of) respective resistive, inductive, and capacitive components of the first RLC branch and the second RLC branch. For example, the duration of the switching transient may be a jitter between legs of the power converter.

In any of the embodiments herein, it may be the case that the RLC branches of a given power converter have the same values of resistance, inductance, and capacitance, within given tolerances. In other embodiments, the RLC branches of a power converter may have different values of resistance, inductance, and capacitance, but where the RLC branches still meet designated criteria as set forth herein (e.g., configured to mitigate voltage spikes based on natural periods of the RLC branches being at least ten times greater than converter leg switching transients). Thus, any instances herein referring to "respective" values or "respective" periods do not necessarily mean different values or periods.

Although embodiments have been illustrated wherein the RLC branches have respective values of resistance, inductance, and capacitance such that respective natural periods of the RLC branches are at least ten times longer than a switching transient (e.g., jitter) associated with the converter legs, in any of the embodiments herein, it may be the case that the natural periods are longer than the switching transient by a smaller degree. For example, depending on circuit components and configurations, it may be possible to have natural periods that are two to three times longer than the switching transient, or four to ten times longer than the switching transient.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described apparatuses and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A power converter apparatus comprising:
   a first converter leg connecting first and second input terminals of the power converter to a first output terminal of the power converter;
   a second converter leg connecting the first and second input terminals to a second output terminal of the power converter;
   a first RLC branch connected from the first input terminal to the first output terminal, the first RLC branch having a first capacitor, a first inductor and a first resistor; and
   a second RLC branch connected from the second input terminal to the second output terminal, the second RLC branch having a second capacitor, a second inductor and a second resistor,
   wherein the first and second RLC branches are configured to mitigate voltage spikes when the first converter leg and second converter leg are switched during commutation of the input and output terminals.

2. The power converter apparatus of claim 1, wherein the first and second RLC branches are configured to mitigate voltage spikes based on having respective values of resistance, inductance, and capacitance such that respective natural periods of the first and second RLC branches are longer than a duration of a switching transient of the power converter apparatus.

3. The power converter apparatus of claim 2, wherein the respective natural periods of the first and second RLC branches are at least ten times a jitter between the first and second converter legs.

4. The power converter apparatus of claim 3, further comprising an output buffer capacitor connected across the first and second output terminals and rated at approximately 18 mF, wherein the first and second converter legs include first and second inductors that are rated at approximately 1.2 mH, and the first and second RLC branches are rated at approximately 20 ohm, 2 µH, and 10 µF.

5. The power converter apparatus of claim 4, wherein the power converter apparatus is connected with approximately 1800 V direct current voltage across the input terminals, and wherein the power converter apparatus further comprises a control module configured to control switching of the first and second converter legs at approximately 600 Hz to provide approximately 750 V direct current voltage across the output terminals.

6. The power converter apparatus of claim 5, wherein the power converter apparatus is configured to deliver approximately 450 kW power to the output terminals.

7. The power converter apparatus of claim 1, further comprising:
   a third RLC branch connected from the first input terminal to the second output terminal; and
   a fourth RLC branch connected from the second input terminal to the first output terminal,
   wherein the third and fourth RLC branches are configured to mitigate voltage spikes during commutation of the input and output terminals.

8. The power converter apparatus of claim 1, wherein the first converter leg comprises a first switch connected from the first input terminal to a first node, a first freewheel diode connected from the first node to the second input terminal, and a first inductor connected from the first node to the first output terminal; and
   the second converter leg comprises a second switch connected from the second input terminal to a second node, a second freewheel diode connected from the second node to the first input terminal, and a second inductor connected from the second node to the second output terminal.

9. A power converter apparatus comprising:
   a plurality of converter legs connecting first and second input terminals of the power converter apparatus with first and second output terminals of the power converter apparatus;
   a first RLC branch connected from the first input terminal to the first output terminal, the first RLC branch having a first capacitor, a first inductor and a first resistor;
   a second RLC branch connected from the second input terminal to the second output terminal, the second RLC branch having a second capacitor, a second inductor and a second resistor;
   a third RLC branch connected from the first input terminal to the second output terminal, the third RLC branch having a third capacitor, a third inductor and a third resistor; and
   a fourth RLC branch connected from the second input terminal to the first output terminal, the fourth RLC branch having a fourth capacitor, a fourth inductor and a fourth resistor,
   wherein the first, second, third, and fourth RLC branches are configured to mitigate voltage spikes when the converter legs are switched during commutation of the input and output terminals.

10. The power converter apparatus of claim 9, wherein the first, second, third, and fourth RLC branches are configured to mitigate voltage spikes based on having respective values of resistance, inductance, and capacitance such that respective natural periods of the first, second, third, and fourth RLC branches are at least ten times a jitter between any of the converter legs.

11. The power converter apparatus of claim 9, wherein the plurality of converter legs comprise:
   a first switch connected from a first input terminal to a first node;
   a first inductor connected from the first node to a first output terminal;
   a second switch connected from the first input terminal to a second node;
   a second inductor connected from the second node to a second output terminal;
   a third switch connected from the first node to the second input terminal; and
   a fourth switch connected from the second node to the second input terminal.

12. A method for mitigating voltage spikes in a power converter when legs of the converter are switched, comprising:
   connecting two or more RLC branches between the input terminals and output terminals of the power converter, each RLC branch having capacitive, inductive and resistive components;
   switching of a plurality of switches that interconnect the input terminals with output terminals to convert power from the input terminals to the output terminals; and
   selecting the respective resistive, inductive, and capacitive components of the two or more RLC branches to produce natural periods of the two or more RLC branches that are longer than a duration of a switching transient of the power converter.

13. The method of claim 12, wherein the duration of the switching transient is a jitter between legs of the power converter, and the natural periods are at least ten times the jitter.

14. The method of claim 12, wherein inductances of the RLC branches are selected to match connecting cables of the RLC branches.

15. The method of claim 12, wherein each inductive component is rated at approximately 1 µH, each resistive component is rated at approximately 20 ohm, and each capacitive component is rated at approximately 5 µF.

16. The method of claim 15, further comprising connecting approximately 1800 V direct current input to the power converter, and switching legs of the power converter at approximately 600 Hz to provide approximately 750 V, 450 kW direct current output.

17. A method of controlling a power converter, comprising:

controlling, with a control module, switching of a plurality of switches that interconnect first and second input terminals of the power converter with first and second output terminals of the power converter, to convert power from the input terminals to the output terminals; and mitigating voltage spikes during the switching with a first RLC branch connected from the first input terminal to the first output terminal and with a second RLC branch connected from the second input terminal to the second output terminal, the first RLC branch having a first capacitor, a first inductor and a first resistor and the second RLC branch having a second capacitor, a second inductor and a second resistor.

18. The method of claim 17, wherein respective natural periods of the first RLC branch and the second RLC branch are longer than a duration of a switching transient of the power converter, said natural periods based on respective resistive, inductive, and capacitive components of the first RLC branch and the second RLC branch.

19. The method of claim 18, wherein the natural periods are at least ten times the duration of the switching transient of the power converter.

20. The method of claim 18, wherein the duration of the switching transient is a jitter between legs of the power converter.

* * * * *